(12) United States Patent
Rusch et al.

(10) Patent No.: US 11,384,854 B1
(45) Date of Patent: Jul. 12, 2022

(54) POP-UP EMITTER

(71) Applicant: National Diversified Sales, Inc., Fresno, CA (US)

(72) Inventors: David Rusch, Springville, CA (US); Ryan Larsen, Visalia, CA (US); Daniel Nourian, Reedley, CA (US); Michael Schreiber, York, PA (US); Clem Neale Vann, III, Austin, TX (US)

(73) Assignee: National Diversified Sales, Inc., Fresno, CA (US)

( * ) Notice: Subject to any disclaimer, the term of this patent is extended or adjusted under 35 U.S.C. 154(b) by 0 days.

(21) Appl. No.: 17/175,506

(22) Filed: Feb. 12, 2021

(51) Int. Cl.
*F16K 15/06* (2006.01)
*F16K 21/04* (2006.01)

(52) U.S. Cl.
CPC ............ *F16K 15/063* (2013.01); *F16K 21/04* (2013.01)

(58) Field of Classification Search
CPC ...... F16K 15/06; F16K 15/063; F16K 15/065; Y10T 137/6988; Y10T 137/6307; Y10T 137/7738
See application file for complete search history.

(56) References Cited

U.S. PATENT DOCUMENTS

| | | | | |
|---|---|---|---|---|
| 936,233 | A * | 10/1909 | Black | F16K 15/06 137/332 |
| 1,191,376 | A * | 7/1916 | Weber | F16K 15/06 137/332 |
| 1,537,701 | A * | 5/1925 | Rothenbucher | F01L 1/32 123/188.8 |
| 3,542,057 | A * | 11/1970 | Staiano | E03F 5/042 137/328 |
| 4,930,539 | A * | 6/1990 | van Rooy | F16K 15/063 137/514 |
| 5,341,523 | A * | 8/1994 | Barnes | E03F 5/0407 137/362 |
| 7,185,671 | B2 * | 3/2007 | Duex | F16K 15/066 137/454.6 |

* cited by examiner

*Primary Examiner* — Reinaldo Sanchez-Medina
*Assistant Examiner* — Nicole Gardner
(74) *Attorney, Agent, or Firm* — Fulwider Patton LLP

(57) ABSTRACT

A pop-up emitter comprising a base defining a circular bore along a central axis. The base further defines a circular opening at a distal end of the bore. A hub is provided, defining an aperture, positioned in the center of the opening. A circular cap is provided, sized to fit inside the opening, the cap including a spike extending perpendicular to the cap from the center of the cap. The spike resides movably within the aperture such that the cap is movable between a closed condition in which the opening is closed, and an open condition in which the opening is open.

12 Claims, 6 Drawing Sheets

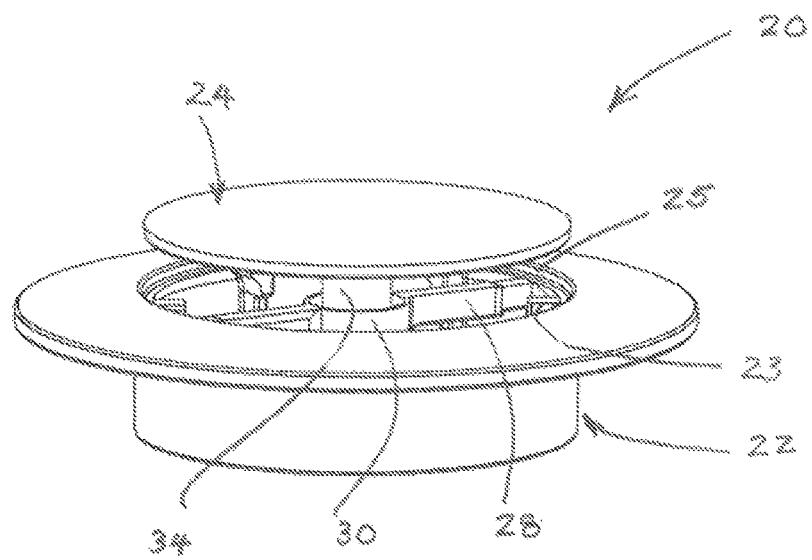
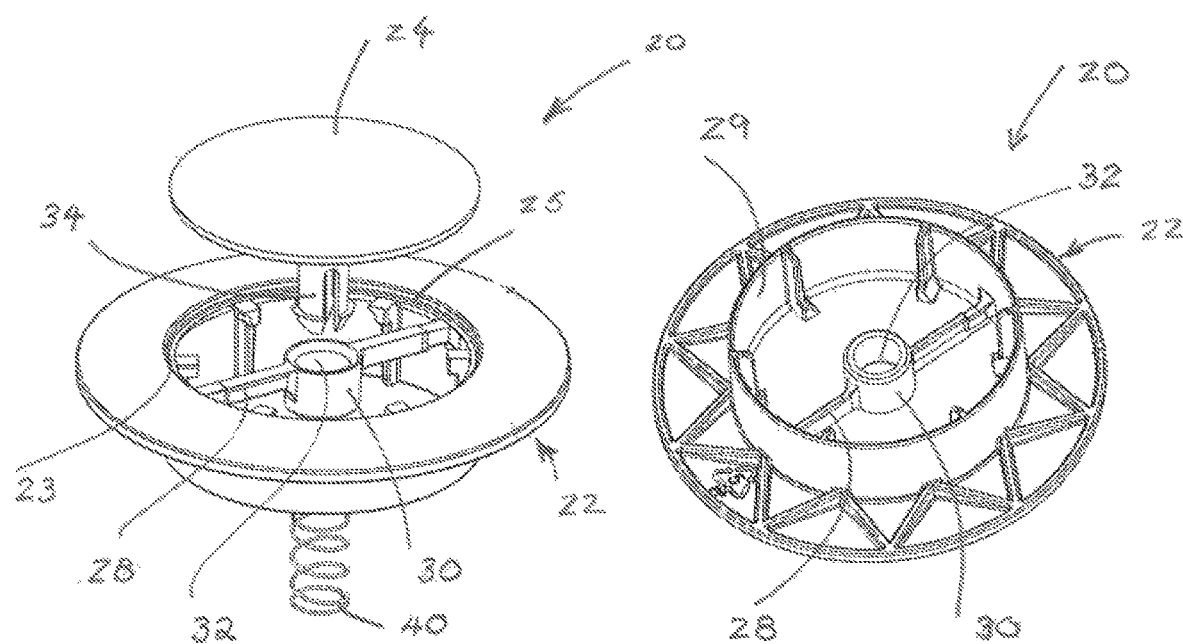
FIG. 1
FIG. 2
FIG. 3A

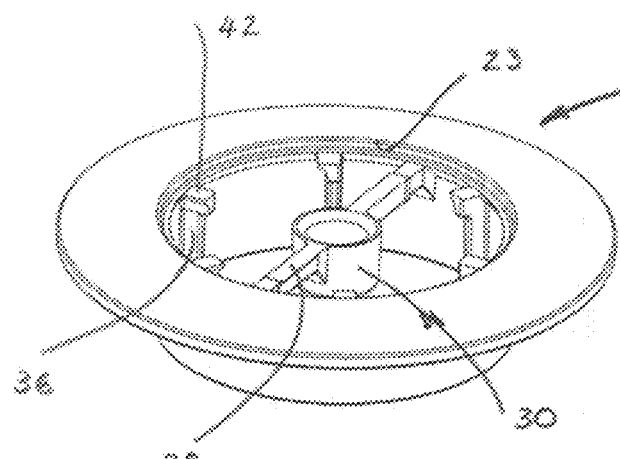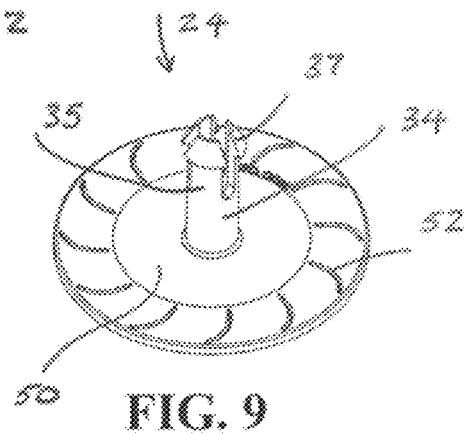
FIG. 8 　　FIG. 9
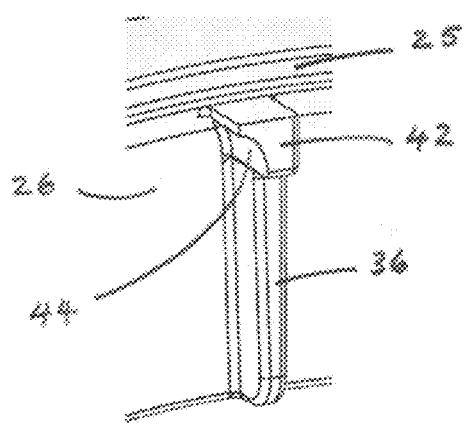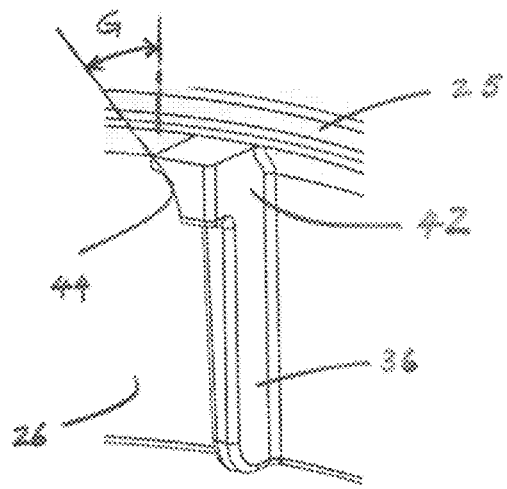
FIG. 10 　　FIG. 11
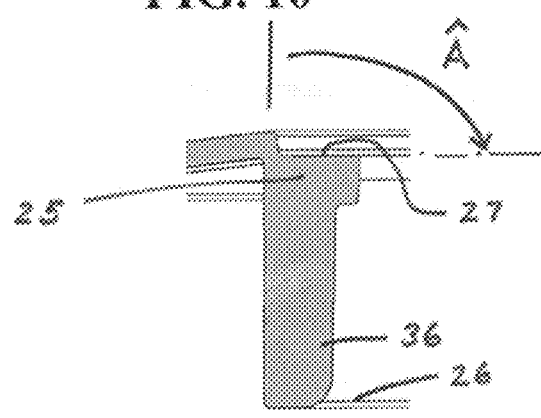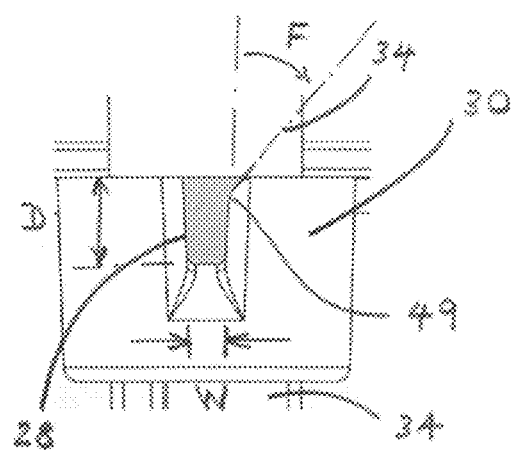
FIG. 12 　　FIG. 12A

POP-UP EMITTER

BACKGROUND

This disclosure relates generally to the field of pressure release valves and irrigation sprinklers. Specifically, the invention relates to a novel and advantageous pop-up emitter configured to seal the end of a drainage pipe.

Pop-up emitters are known in the art. Typically, a pop-up emitter is placed at the lowest end of a cylindrical drainage pipe system which has been placed in the earth to drain water from a point of collection to a point of discharge. The downstream end of the piping system opens to daylight at the ground surface which allows conveyed water to discharge by gravity. However, to prevent unsightly and continuous leaking, and also to prevent debris, insects and rodents from entering the drainage pipe, it has been known to place a spring operated pressure valve to cover the downstream piping end. When the water pressure head in the piping system reaches a certain magnitude, the spring will deform, and allow water in the pipe to emit therefrom until the pressure head is back to equilibrium, whereupon the valve reseals and water stops leaking from the downstream end. An example of a known pop-up emitter 200 is shown in FIGS. 13-15. A typical pop-up emitter known in the art comprises a base 202 with a central opening 205. A cap 204 is sized and fitted to seal the opening when the cap is flush with the base. A spring 220 is positioned to bias the cap towards a closed position. The cap 204 is stabilized by a hub 210, through which a spike 212 attached to the cap 204 extends. The hub is held in position by spokes 208 which extend between the hub and a perimeter of the central opening.

Pop-up emitters have solved some of the problems in the art. However, problems continue to persist. For example, being placed outside flush with the ground, pop-up emitters may encounter debris, soil, and grass with adverse effect. This may require regular expensive maintenance and frequent replacement of the entire pop-up system.

Thus, there exists a need to provide a cost effective and easy to manufacture pop-up emitter which solves these, and other needs.

SUMMARY OF THE INVENTION

In one embodiment, the invention is a pop-up emitter comprising a base defining a circular bore along a central axis, the base further defining a circular opening at a distal end of the bore. A hub is provided defining an aperture, the hub being positioned in the center of the opening, the hub being connected to the base by at least two spokes extending radially between the hub and an internal surface of the bore. A circular cap is provided, and is sized to fit inside the opening, the cap including a spike extending perpendicular to the cap from the center of the cap, wherein, the spike resides movably within the aperture such that the cap is movable between a closed condition in which the opening is closed, and an open condition in which the opening is open. A spring is provided, and surrounds the spike. The spring is configured to urge the cap between an open and a closed condition. Under the described structure, the base defines a plurality of solid surfaces within the bore, each solid surface being positioned at an angle, between 20 and 45 degrees, to an imaginary vertical plane that includes the central axis, whereby each solid surface tends to impart a rotational motion to water flowing through the bore. Further, the circular cap has an under-side facing towards the base, and a plurality of elongate vanes protrude from the under-side and extend at an angle from an imaginary radial line extending away from the center of the cap, whereby the elongate vanes tend to impart a rotational motion to water flowing out of the bore.

In some embodiments, the plurality of solid surfaces within the bore include solid surfaces that are formed on a surface of each spoke.

In some embodiments, the plurality of solid surfaces within the bore include solid surfaces that are attached to an internal wall of the bore.

In yet further embodiments, vanes are curved, and have a radius of curvature of between 1 cm and 2 cm, and a depth from the under-side of between 2 mm and 4 mm.

In yet further embodiments, the base defines a plurality of internal ribs inside the bore, wherein the ribs include a first surface and a second surface positioned perpendicular to the first surface, and wherein a chamfer surface is positioned to connect the first surface to the second surface, the chamfer surface being positioned at an angle of between 30 degrees and 60 degrees to the first surface and the second surface. Under this configuration, the chamfer surface may be between 0.5 mm and 1.5 mm in length between the first surface and the second surface.

In yet further embodiments, the bore defines an internal flange configured to seat an external edge of the cap, the internal flange being between 1 mm and 2 mm in radial length. Under this configuration, an upper surface of the internal flange may slope downward toward the axis of the bore, at an angle of between 93 degrees and 95 degrees to a vertical axis.

In yet further embodiments, each spoke may have a rectangular cross section having an aspect ratio of axial depth divided by radial width of not less than 1.5.

In yet further embodiments, each spoke may include a first surface and a second surface positioned perpendicular to the first surface, and wherein a chamfer surface is positioned to connect the first surface to the second surface, the chamfer surface being positioned at an angle of between 30 degrees and 60 degrees to the first surface and the second surface. Under this configuration, the chamfer surface may be between 0.5 mm and 1.5 mm in length between the first surface and the second surface.

In yet further embodiments, a tip of the spike is hollow, and comprises three sub-spikes wherein each sub-spike defines an outwardly extending barb. Under this configuration, the three sub-spikes are sufficiently flexible to allow them to be compressed so as to touch each other by an inwardly applied force.

Other objects, features and advantages of the present invention will be apparent when the disclosure is considered in conjunction with the detailed description and the drawings set forth herein, which should be construed in an illustrative and not limiting sense.

BRIEF DESCRIPTION OF THE DRAWINGS

FIG. 1 shows a perspective view from above, of an emitter having features of the present invention, in an open condition.

FIG. 2 shows perspective exploded view of components of the emitter shown in FIG. 1.

FIG. 3A shows a perspective view, from below, of a base component of the emitter shown in FIG. 1.

FIG. 8 shows a perspective view, from above, of a base component of the emitter shown in FIG. 1.

FIG. 9 shows a perspective view, from below, of a cap component of the emitter shown in FIG. 1.

FIG. 10 shows in perspective from a side, a detail of the base component of the emitter shown in FIG. 1.

FIG. 11 shows in perspective from a different side, a detail of the base component of the emitter shown in FIG. 1.

FIG. 12 shows a side sectional view of a detail of the base component of the emitter shown in FIG. 1.

FIG. 12A shows a sectional view of a detail of the base component, taken substantially along the line R-R in FIG. 3B.

Reference will hereinafter be made to the drawings in which similar elements in different drawings bear the same reference numerals.

DETAILED DESCRIPTION OF THE PREFERRED EMBODIMENTS

Figure 3B:
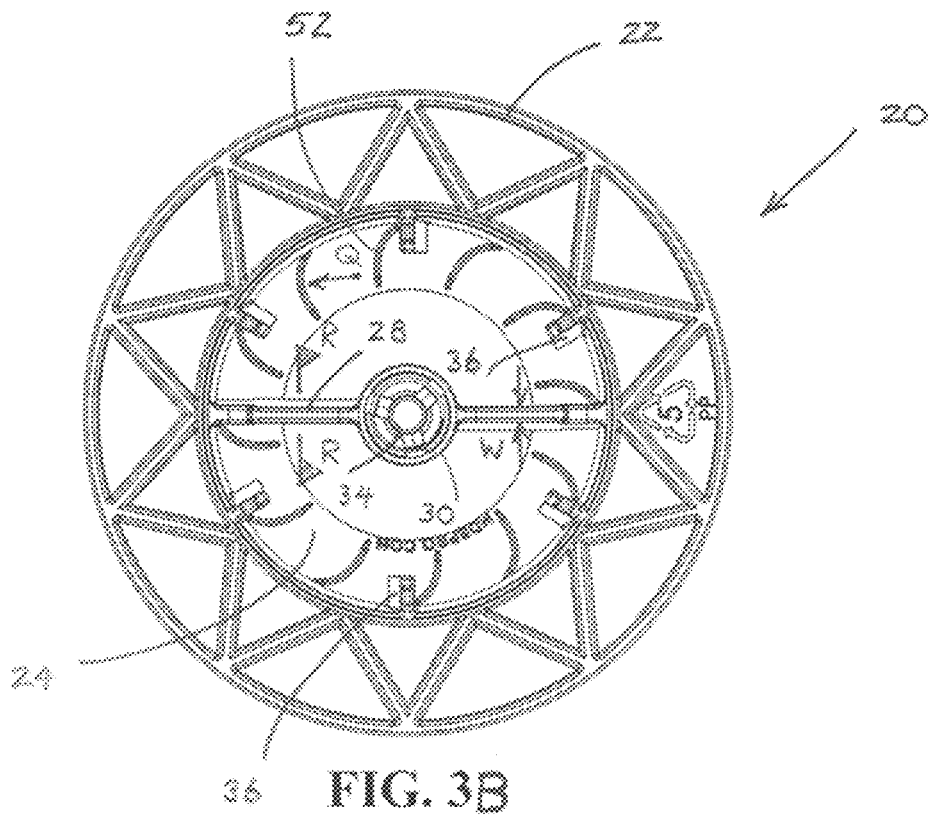
FIG. 3B shows a plan view, from below, of the emitter shown in FIG. 1, in a closed condition.
Figure 4:
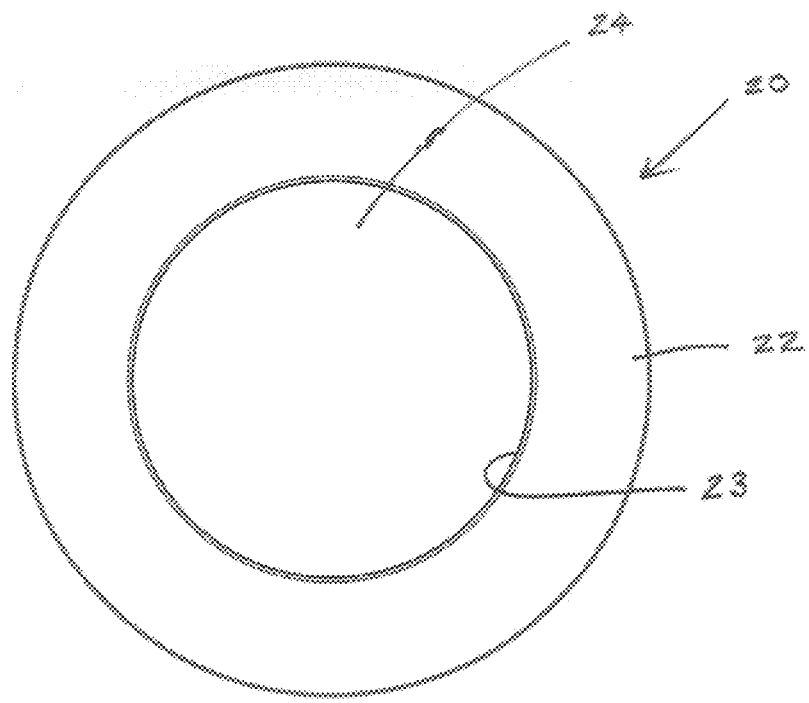
FIG. 4 shows a plan view from above, of the emitter shown in FIG. 1, in a closed condition.

In the following detailed description, certain preferred embodiments are described in order to provide a thorough understanding of the present invention.

FIG. 1 shows an emitter 20 having features of the invention. A circular cylindrical base 22 is provided, which defines a central circular opening 23. A cap 24 is provided which is moveable in relation to the base 22, and sized to fit snugly within the opening 23. A short internal flange 25 is provided inside the opening 23 to provide a seat for the cap to bear against for sealing the opening 23, at the same time as allowing an upper surface of the cap and an upper surface of the base to be approximately horizontally flush with each other.

In order to stabilize vertical up and down movement of the cap 23 in relation to the base 22, a central hub 30 is positioned in the center of the opening 23. The hub has a central aperture 32, and is fixed to an interior rim of the opening 23 by two elongate spokes 28 extending along a coaxial straight line to points on the rim separated by 180 degrees. In a preferred embodiment, the spokes have a generally rectangular cross sectional shape, and have an aspect ratio of depth D (FIG. 7) to width W (FIG. 3B) of not less than 1.5. Also indicated in FIG. 12A. By arranging the spokes to have greater depth than width, this has the two-fold advantage of (a) presenting a diminished area of resistance to the water rushing through the bore 29, and also (b) enhancing the strength of the spokes in the vertical direction which is the direction of load which occurs when a person accidentally steps on the cap. The prior art has a weak link in this regard, where the spoke is arranged to have a broader width than depth.

Figure 6:
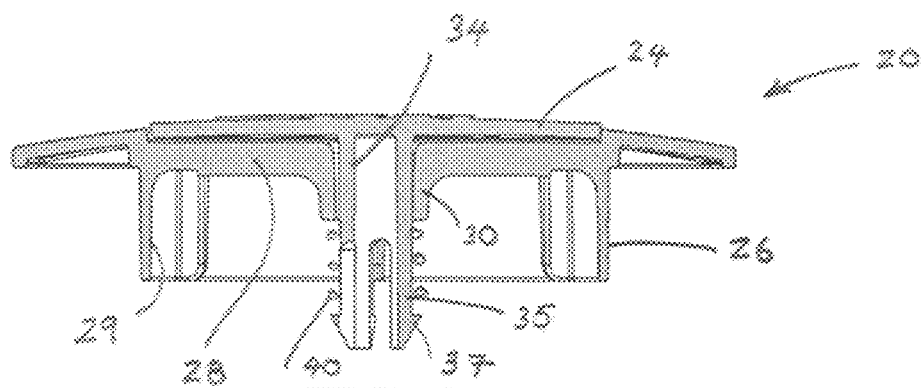
FIG. 6 shows a side sectional view of the emitter having features of the present invention, in a closed condition.
Figure 7:
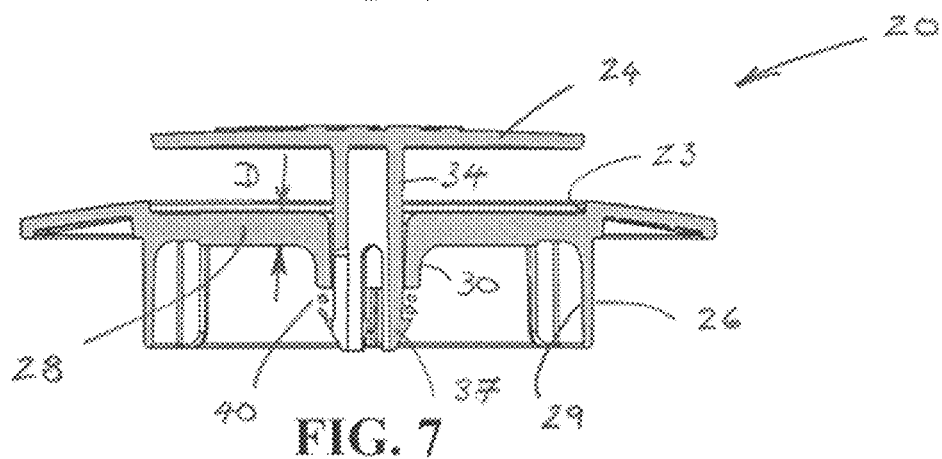
FIG. 7 shows a side sectional view of the emitter having features of the present invention, in an open condition.
Figure 13:
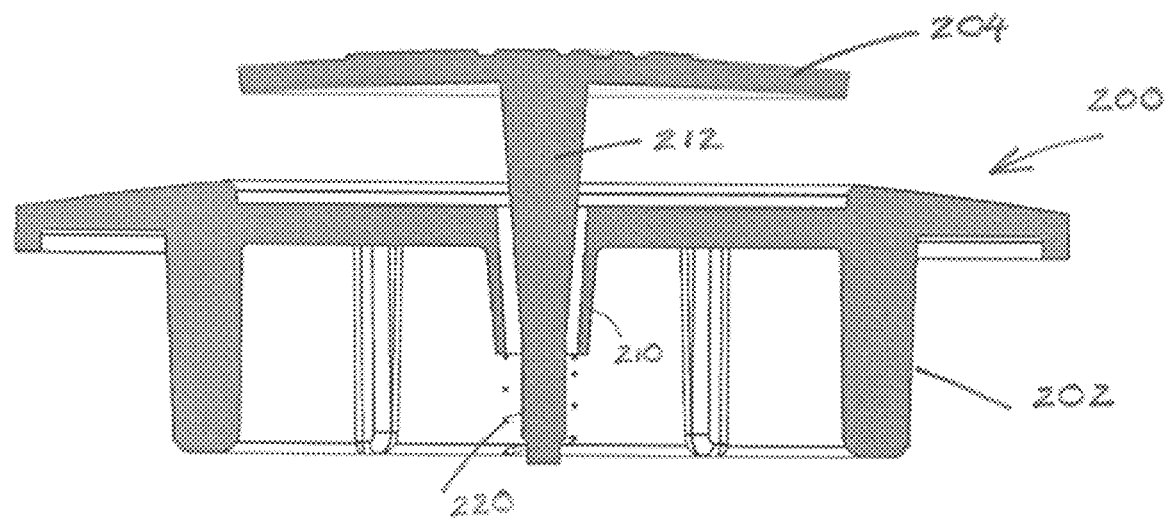
FIG. 13 shows a side sectional view of an emitter known in the prior art.
Figure 14:
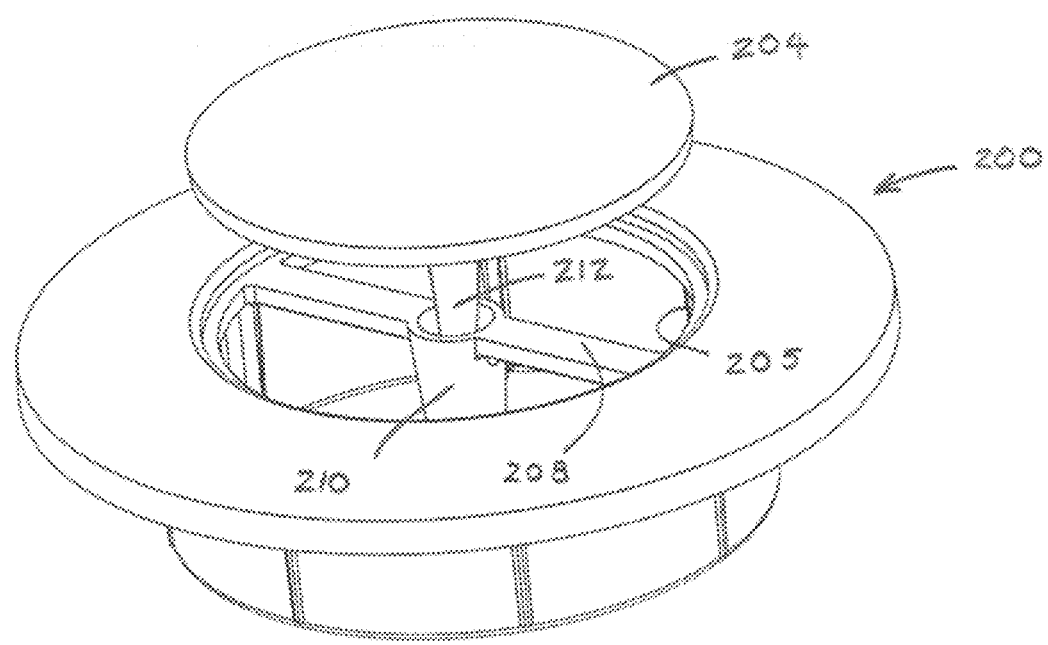
FIG. 14 shows a perspective view, from above, of an emitter known in the prior art.
Figure 15:
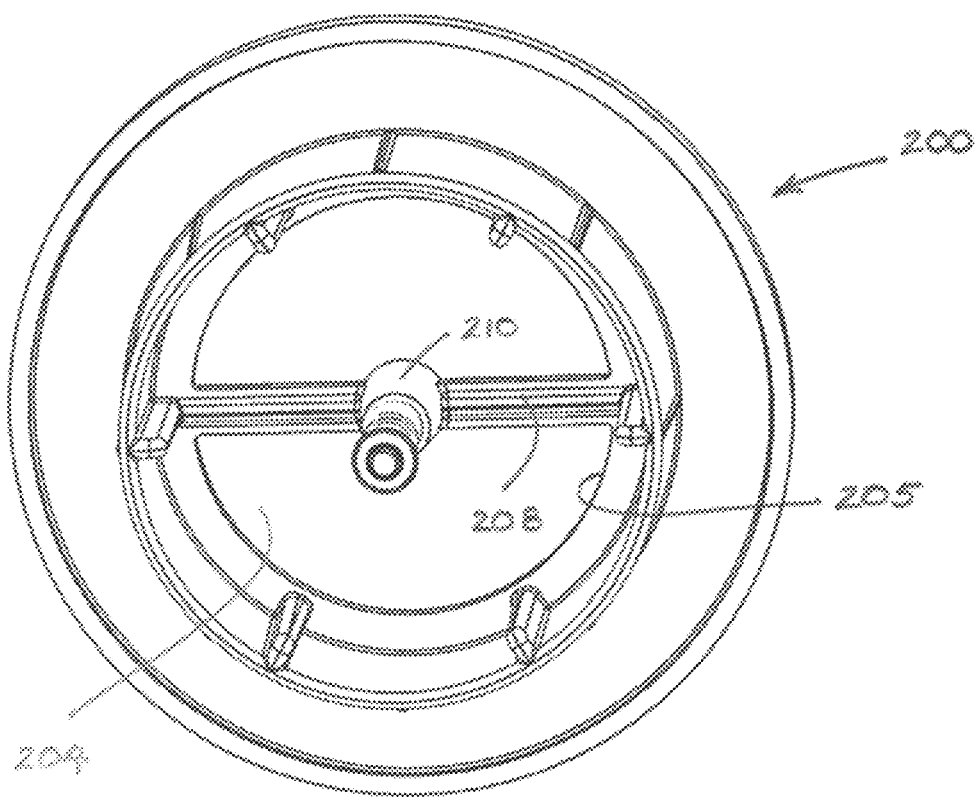
FIG. 15 shows a perspective view, from below, of an emitter known in the prior art.

A spike 34 is affixed to the center of the cap and extends perpendicular to the cap 24, as shown in FIG. 9. The spike is sized to pass through the aperture 32 in the hub 30. The tip of the spike is hollow, and defines, in a preferable embodiment, three sub-spikes 35 each with an outwardly extending barb 37 which has the result of configuring the spike to be detained in the aperture of the hub so that it can be removed only if a user crimps the sub-spikes 35 together. A compression spring 40 is provided to surround the spike 34, and to extend between the barbs 37 and a point on the base, so that any movement of the cap towards an open condition (as shown in FIG. 7) is then urged towards a closed condition (as shown in FIG. 6).

Figure 5:
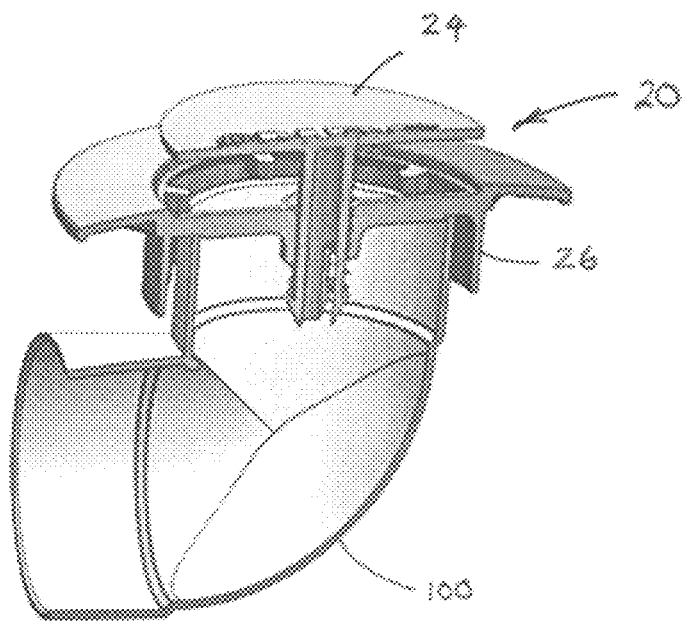
FIG. 5 shows a cross sectional view, in perspective, of an emitter of the present invention, mounted on a drain pipe.

In use, the emitter 20 may be installed on the end of a drain pipe 100, or other terminal opening, as exemplified in FIG. 5. Here, the cap includes a cylindrical collar 26 which is sized to snugly fit over the drain pipe 100 and thereafter secured into position. The drain 100 is then buried in the soil, just deep enough to allow the emitter 20 to lie flush with the surface of the soil. When the drain pipe fills with water, pressure builds up behind the emitter but does not emerge from the emitter while the spring has sufficient force to keep it in the closed condition. When the pressure head behind the emitter is great enough, the cap 24 is forced away from the base 22, against the urging of the spring 40, to the open condition. Water surges from the space between the cap 24 and the base 22, until the pressure head is relieved and the spring 40 forces the cap to the closed condition once more. FIG. 6.

In the case of the emitter of the present invention, however, further novel and advantageous features are applied that allow the water to flow with greater velocity through the emitter, and therefore to reduce the likelihood of, debris, grass, or sand becoming lodged in the emitter where it may ultimately result in a blockage that must be cleaned to avoid great expense and inconvenience of flooding or seepage.

In a feature of the invention, elements inside the collar are arranged to impart a rotational angular momentum to water emitting from the opening, with the result that the water tends to adopt a more rapid streaming flow, and tends to avoid a slower turbulent flow.

In furtherance of this effect, a plurality of ribs 36 are molded onto the inner surface of the collar 26. The ribs serve the twofold function of a) strengthening the collar 26 during the molding process and b) providing a support for a stationary deflector 42 which has an angled surface 44 as best seen in FIGS. 10 and 11. The angled surface includes a plane at an angle "G" (FIG. 11) to a plane passing through the vertical axis of the collar. Preferably, there may be six such deflectors 42 with angled surfaces 44 positioned evenly around the perimeter of the opening 23. In a preferred embodiment, the angle "G" of surface 44 to the vertical is between 20 and 45 degrees. Thus, water flowing vertically through the collar 26 is forced to change direction with the net result of rotating about the axis of the collar on its way through the gap between base 22 and cap 24.

An advantage provided by rotating the water flowing through the emitter is that it more easily maintains a steady flow regime, and does not find itself in a turbulent flow regime as it would if simply forced through the emitter 20 in an axial direction where it would impact perpendicularly onto the under-side of the cap. By maintaining a rotating steady flow, the velocity of the water increases to a magnitude greater than the alternative turbulent flow. The greater velocity of the rotating flow enhances the effect of the water in cleaning out sand and debris from the interior of the emitter, and avoids the complications involved in cleaning out a clogged emitter.

In further accord with the foregoing principle, in another aspect of the emitter 20, each spoke 28 is configured to define a deflector surface 49 best seen with reference to FIG. 12A, which shows a vertical sectional view through a spoke 28. The deflector surface 49 is formed on one vertical side of a spoke to be at an angle "F" to the vertical plane, as shown in FIG. 12A. This deflector surface 49 provides the advantage that water flowing out of the opening 23 is provided with a deflected motion that tends to cause the water to rotate about the axis of the emitter. In a preferred embodiment, the deflector surface is angled at between 20 and 45 degrees to a vertical plane.

Referring to FIG. 3B and FIG. 9, in another aspect of the purpose of imparting a rotation to the water flowing out of the bore, the cap 24 of the emitter is configured so that the under-side 50 of the cap is fabricated to include vanes 52 which are elongate protrusions (preferably between 2 mm and 4 mm in depth) from the under-side 50, extending elongatedly at an angle from an imaginary radial line extending away from the center of the cap 24. In an additional aspect, the vanes are curved so that the angle formed between a tangent to the vane and the imaginary radial line increases along points on the vane that are further away from the center of the cap. This feature has been found to increase the rotational flow of water leaving the bore of the cap. Water is forced upwards against the under-side 50 of the cap, but because the cap itself is not configured to rotate, the water itself will tend to rotate, and enhance the streaming flow regime while tending to avoid the turbulent flow regime that would otherwise take place. In a preferred embodiment, the vanes have a horizontal curvature radius "Q" (as indicated in FIG. 3B) of between 1 cm and 2 cm and a depth from the underside of between 2 mm and 4 mm.

In another aspect of the invention, the flange 25 on the inside of the bore, which forms the seat for the cap, is shortened substantially compared to that of the prior art, and is preferably not more than 2 mm in length radially measured. This has the effect of reducing the amount of surface area upon which sand and debris can accumulate. Such accumulation, when it occurs, has the effect of preventing an effective seal between the cap and the base from forming. Further, accumulation can slowly choke the bore of the emitter, so that eventually, complete blockage may be the result. In a further feature, the flange 25 has an upper surface 27 (FIG. 12) which is configured to bear against a lower surface of the cap 24. The upper surface 27 is configured to have a gradual slope at an angle shown in FIG. 12 as angle "A" from the vertical. In a preferred embodiment, angle A is between 93 and 96 degrees from vertical. This downward decline provides water and silt, that might otherwise stand on the upper surface 27, to drain off once water flow through the emitter has ceased.

In another aspect of the present invention, all surfaces which protrude into the bore 29 of the base 26 and which are perpendicular to each other, are provided with a chamfer which is an intermediate surface angled at preferably 45 degrees to the perpendicular surfaces, but alternatively between 30 degrees and 60 degrees. This effect is exemplified in FIG. 11, where the length of the chamfer between perpendicular surfaces of the rib 36 is shown to have a chamfer of "C" in length. The length of the chamfer is preferably between 0.5 mm and 1.5 mm in length. Preferably, all perpendicular surfaces of the ribs, the hub, and the spokes—to the extent they protrude into the bore 29 and face the flow of water—are each provided with a chamfer as described. This feature is found to have the advantageous effect of reducing the amount of "snagging" which takes place, wherein grass and other small debris tends to snag and suspend on perpendicular surfaces extending into the bore of an emitter and thereby add to the effect of clogging the emitter.

Thus, the present invention applies the described features to a pop-up emitter and produces a novel structure as claimed, that has the advantage of providing a self-cleaning emitter that tends to avoid clogging and debris build up.

Although preferred illustrative variations of the present invention are described above, it will be apparent to those skilled in the art that various changes and modifications may be made thereto without departing from the invention. For example, it will be appreciated that combinations of the features of different embodiments may be combined to form another embodiment. It is intended in the appended claims to cover all such changes and modifications that fall within the true spirit and scope of the invention.

We claim:

1. A pop-up emitter comprising:
   a base defining a circular bore along a central axis, the base further defining a circular opening at a distal end of the bore;
   a hub, defining an aperture, positioned in the center of the opening, the hub being connected to the base by at least two spokes extending radially between the hub and an internal surface of the bore;
   a circular cap sized to fit inside the opening, the cap including a spike extending perpendicular to the cap from the center of the cap, wherein, the spike resides movably within the aperture such that the cap is movable between a closed condition in which the opening is closed, and an open condition in which the opening is open;
   a spring surrounds the spike, configured to urge the cap between the open and the closed condition;
   wherein, the base defines a plurality of solid surfaces within the bore, each solid surface being positioned at an angle, between 20 and 45 degrees, to an imaginary vertical plane that includes the central axis, whereby each solid surface tends to impart a rotational motion to water flowing through the bore;
   further wherein, the base defines a plurality of internal ribs inside the bore, wherein the ribs include a first surface and a second surface positioned perpendicular to the first surface, and wherein a chamfer surface is positioned to connect the first surface to the second surface, the chamfer surface being positioned at an angle of between 30 degrees and 60 degrees to the first surface and the second surface;
   further wherein, the circular cap has an under-side facing towards the base, and a plurality of elongate vanes protrude from the under-side and extend at an angle from an imaginary radial line extending away from the center of the cap, whereby the elongate vanes tend to impart a rotational motion to water flowing out of the bore.

2. The pop-up emitter of claim 1, wherein the plurality of solid surfaces within the bore include solid surfaces that are formed on a surface of each spoke.

3. The pop-up emitter of claim 1, wherein the plurality of solid surfaces within the bore include solid surfaces that are attached to an internal wall of the bore.

4. The pop-up emitter of claim 1, wherein the vanes are curved, and have a radius of curvature of between 1 cm and 2 cm, and a depth from the under-side of between 2 mm and 4 mm.

5. The pop-up emitter of claim 1, wherein the chamfer surface is between 0.5 mm and 1.5 mm in length between the first surface and the second surface.

6. The pop-up emitter of claim 1, wherein the bore defines an internal flange configured to seat an external edge of the cap, the internal flange being between 1 mm and 2 mm in radial length.

7. The pop-up emitter of claim 6, wherein an upper surface of the internal flange slopes downward toward the axis of the bore, at an angle of between 93 degrees and 95 degrees to a vertical axis.

8. The pop-up emitter of claim 1, wherein each spoke has a rectangular cross section having an aspect ratio of axial depth divided by radial width of not less than 1.5.

9. The pop-up emitter of claim 1, wherein a tip of the spike is hollow, and comprises three sub-spikes wherein each sub-spike defines an outwardly extending barb.

10. The pop-up emitter of claim 9, wherein the three sub-spikes are sufficiently flexible to allow them to be compressed so as to touch each other by an inwardly applied force.

11. A pop-up emitter comprising:
a base defining a circular bore along a central axis, the base further defining a circular opening at a distal end of the bore;
a hub, defining an aperture, positioned in the center of the opening, the hub being connected to the base by at least two spokes extending radially between the hub and an internal surface of the bore;
wherein each spoke includes a first surface and a second surface positioned perpendicular to the first surface, and wherein a chamfer surface is positioned to connect the first surface to the second surface, the chamfer surface being positioned at an angle of between 30 degrees and 60 degrees to the first surface and the second surface;
a circular cap sized to fit inside the opening, the cap including a spike extending perpendicular to the cap from the center of the cap, wherein, the spike resides movably within the aperture such that the cap is movable between a closed condition in which the opening is closed, and an open condition in which the opening is open;
a spring surrounds the spike, configured to urge the cap between an open and a closed condition;
wherein, the base defines a plurality of solid surfaces within the bore, each solid surface being positioned at an angle, between 20 and 45 degrees, to an imaginary vertical plane that includes the central axis, whereby each solid surface tends to impart a rotational motion to water flowing through the bore;
further wherein, the circular cap has an under-side facing towards the base, and a plurality of elongate vanes protrude from the under-side and extend at an angle from an imaginary radial line extending away from the center of the cap, whereby the elongate vanes tend to impart a rotational motion to water flowing out of the bore.

12. The pop-up emitter of claim 11, wherein the chamfer surface is between 0.5 mm and 1.5 mm in length between the first surface and the second surface.

\* \* \* \* \*